(12) United States Patent
Muskat et al.

(10) Patent No.: US 10,227,896 B2
(45) Date of Patent: Mar. 12, 2019

(54) FLOW SEGREGATOR FOR INFRARED EXHAUST SUPPRESSOR

(71) Applicants: ROLLS-ROYCE NORTH AMERICAN TECHNOLOGIES, INC., Indianapolis, IN (US); ROLLS-ROYCE CORPORATION, Indianapolis, IN (US)

(72) Inventors: James C. Muskat, Mooresville, IN (US); Todd S. Taylor, Bargersville, IN (US); Mike Nesteroff, Indianapolis, IN (US); Eric Donovan, Fishers, IN (US); James Carl Loebig, Greenwood, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 322 days.

(21) Appl. No.: 15/073,282

(22) Filed: Mar. 17, 2016

(65) Prior Publication Data

US 2017/0342863 A1    Nov. 30, 2017

(51) Int. Cl.
| | |
|---|---|
| F01D 25/30 | (2006.01) |
| F01D 11/00 | (2006.01) |
| F01D 9/04 | (2006.01) |
| F02K 1/38 | (2006.01) |
| F02K 1/82 | (2006.01) |

(52) U.S. Cl.
CPC ......... *F01D 25/305* (2013.01); *F01D 9/041* (2013.01); *F01D 11/003* (2013.01); *F02K 1/386* (2013.01); *F02K 1/825* (2013.01); *F05D 2220/323* (2013.01); *F05D 2260/96* (2013.01)

(58) Field of Classification Search
CPC ........ F01D 25/305; F01D 25/30; F01D 9/041; F01D 11/003; F01D 11/00; F05D 2220/323; F05D 2260/96; Y02T 50/675
USPC .................................. 60/324; 415/1, 116, 47
See application file for complete search history.

(56) References Cited

U.S. PATENT DOCUMENTS

| | | | |
|---|---|---|---|
| 3,981,143 A | 9/1976 | Ross et al. | |
| 4,099,375 A * | 7/1978 | Inglee | ................... F01N 13/082 60/39.5 |
| 6,182,440 B1 | 2/2001 | Bilenas et al. | |
| 6,606,854 B1 | 8/2003 | Siefker et al. | |
| 7,758,296 B2 | 7/2010 | Borchers et al. | |
| 8,157,270 B2 | 4/2012 | Tsou et al. | |
| 8,322,126 B2 | 12/2012 | Bies et al. | |
| 8,870,530 B2 | 10/2014 | Morvant et al. | |

(Continued)

*Primary Examiner* — Audrey K Bradley
*Assistant Examiner* — Kelsey Stanek
(74) *Attorney, Agent, or Firm* — Duane Morris LLP

(57) ABSTRACT

Systems and methods for suppressing infrared radiation generated by a turbine engine. A system comprises a primary assembly having a center body, a plurality of vanes extending from the center body, an outer radial duct with the plurality of vanes extending therethrough, a structural baffle, and a mixer. The primary assembly is disposed in the exhaust flow path of a turbine engine and encased in ducting and/or an airfoil. An air flow path defined between the center body and outer radial duct is axially spit by an interface rim and flow segregator. The flow segregator segregates engine core flow from ambient air flow.

20 Claims, 10 Drawing Sheets

(56) References Cited

U.S. PATENT DOCUMENTS

| | | | |
|---|---|---|---|
| 2005/0274117 A1* | 12/2005 | Sheoran | F02C 7/12 |
| | | | 60/782 |
| 2009/0140497 A1 | 6/2009 | Roberts et al. | |
| 2011/0047974 A1 | 3/2011 | Henry et al. | |
| 2013/0336759 A1* | 12/2013 | Christians | F01D 25/30 |
| | | | 415/1 |
| 2015/0252688 A1* | 9/2015 | Marsh | F01D 25/14 |
| | | | 415/144 |

* cited by examiner

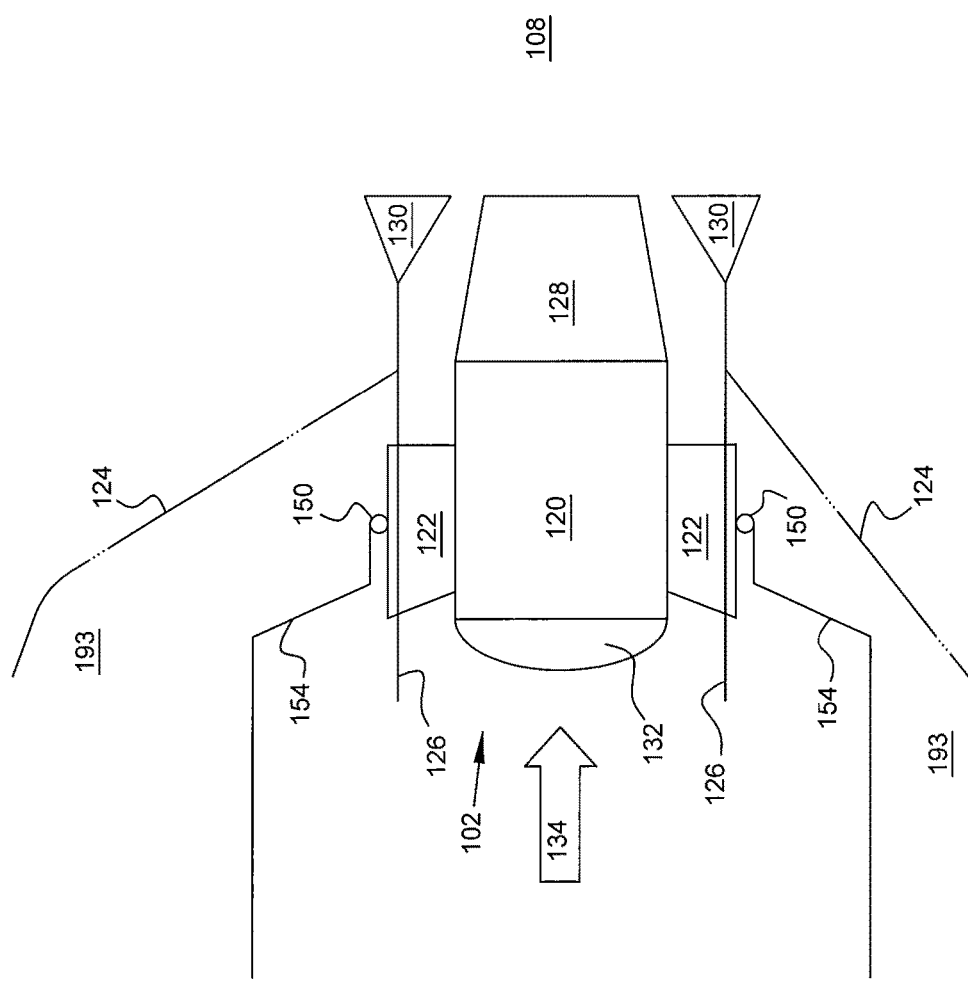

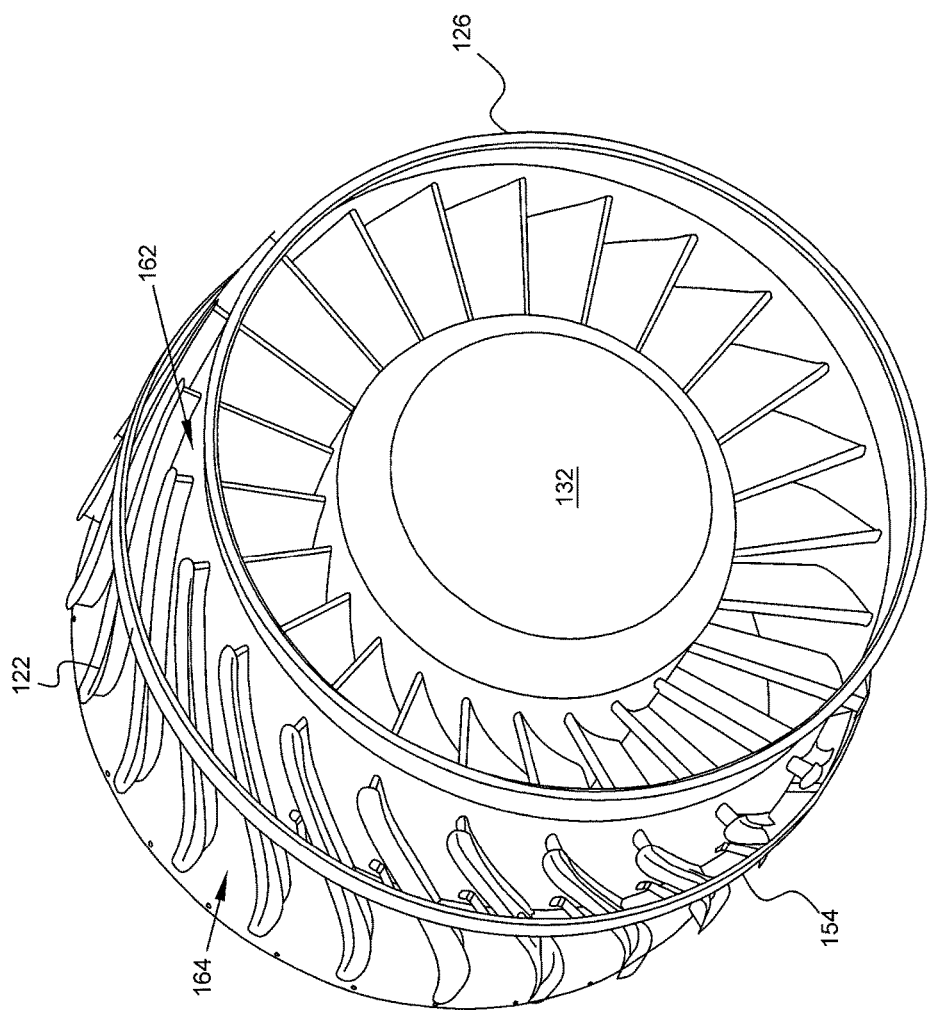

FLOW SEGREGATOR FOR INFRARED EXHAUST SUPPRESSOR

FIELD OF THE DISCLOSURE

The present disclosure relates generally to exhaust treatment, and more specifically to systems and methods of turbine engine exhaust gas treatment.

BACKGROUND

In some applications, it is desirable to mix the exhaust gases of a turbine engine with cooler air to reduce noise and infrared radiation generated by the turbine engine. For example, in military aircraft propelled by at least one gas turbine engine, it is desirable to reduce infrared radiation of the gas turbine engine in order to make the aircraft less vulnerable to common anti-aircraft weaponry which use infrared homing systems.

Previous efforts to suppress infrared radiation generated by a turbine engine have included the placement of mixing devices into the engine's exhaust path, such as the mixer disclosed in U.S. Pat. No. 6,606,854. However, these mixing devices are generally limited in their ability to operate at all ranges of engine performance and aircraft speeds. Thus, there is room for improvement in the art.

In some prior suppression systems, ambient air is admitted to the secondary via air inlet ducting in the vicinity of the engine compartment. As an aircraft achieves forward motion, the rate of airflow into the secondary air inlet ducting is a function of the aircraft's velocity, but since the secondary ducting is decoupled from the primary ducting system, engine compartment purge flow is not back-pressured. More advanced modern aircraft, particularly in military applications, may need to operate with effective infrared suppression and engine compartment purge flow across a wider range of engine performance. For example, vertical takeoff and landing (VTOL) or short takeoff and landing (STOL) aircraft require adequate infrared suppression during operations with low or even no forward velocity such as vertical takeoff, vertical landing, or hover operations.

A similar problem for VTOL, STOL, and other modern aircraft is the potential overpressurization of the engine compartment during high velocity flight. High forward velocity flight captures a high volume of ambient airflow into the air inlet ducting and a resultant higher stagnation pressure of the ambient air in the mixing region. If the differential pressure between the ambient air in the mixing region and the engine compartment becomes too great, then the engine compartment exhaust flow may have a resultant decrease in flow volume exiting the turbine engine compartment, creating a "stagnation" effect which can excessively heat engine components causing thermal failure and rendering infrared suppression ineffective.

BRIEF DESCRIPTION OF THE DRAWINGS

The following will be apparent from elements of the figures, which are provided for illustrative purposes and are not necessarily to scale.

FIG. 1B is a detailed side cutaway schematic diagram of a system for turbine engine exhaust treatment in accordance with some embodiments of the present disclosure.

FIG. 3 is an isometric view of a partially-assembled primary assembly having a center body, a plurality of S-vanes, a circumferential member, and an interface rim in accordance with some embodiments of the present disclosure.

Figure 1A:
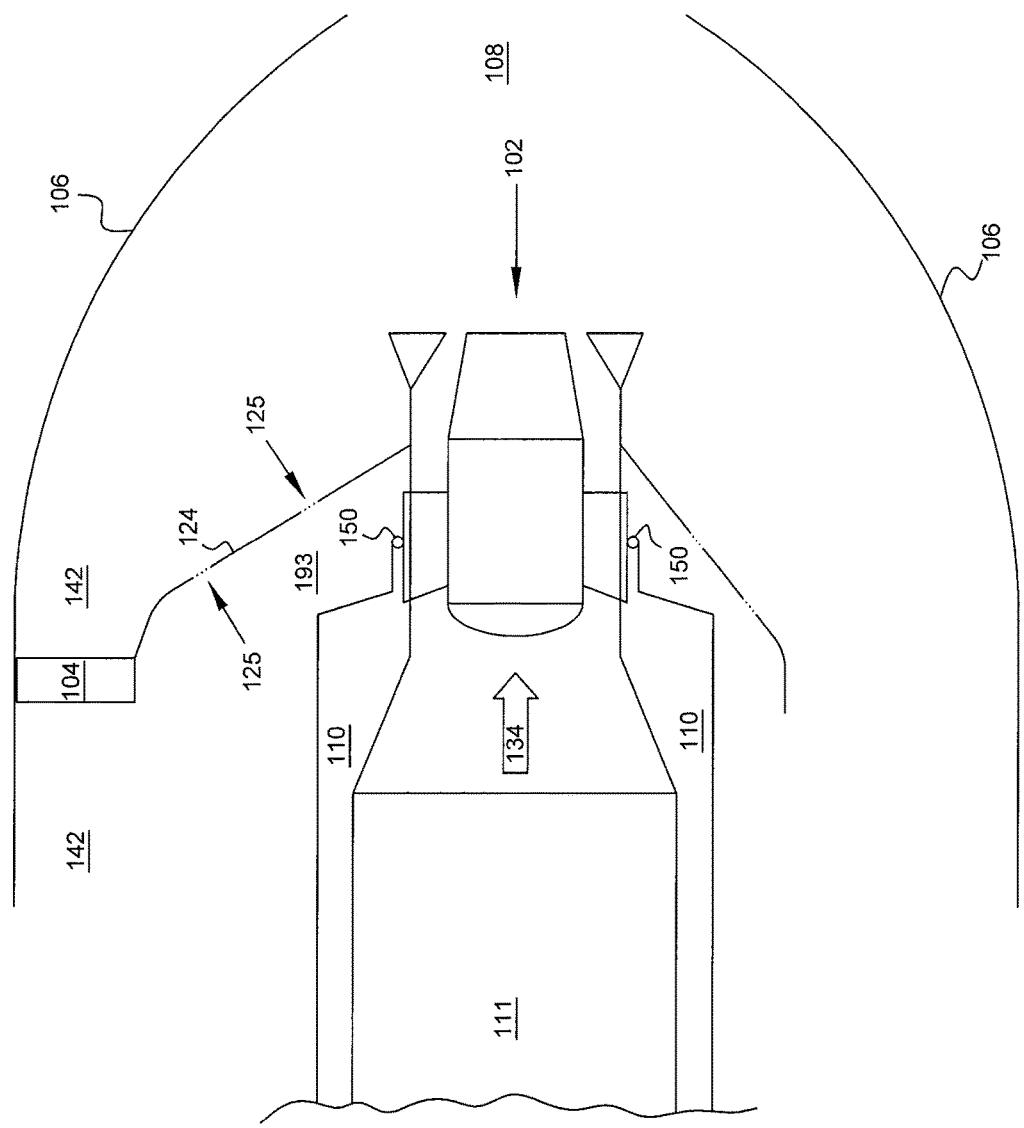
FIG. 1A is a side cutaway schematic diagram of a system for turbine engine exhaust treatment in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to systems and methods for suppressing infrared radiation generated by a turbine engine which overcome the deficiencies noted above. Specifically, the disclosed system comprises a primary assembly having a center body, a plurality of vanes extending from the center body, an outer duct with the plurality of vanes extending therethrough, a structural baffle, and a mixer. The primary assembly is disposed in the turbine engine core exhaust flow path of a turbine engine and encased in ducting. An air flow path between a primary outer duct and a secondary duct is axially spit by an interface rim and flow segregator. The flow segregator segregates engine compartment exhaust flow from ambient air flow.

FIG. 1 is a side cutaway schematic diagram of a system 100 for turbine engine core exhaust treatment in accordance with some embodiments of the present disclosure. System 100 comprises a primary assembly 102 disposed between an engine compartment 110 and an exhaust region 108. An engine 111 is disposed within engine compartment 110. In some embodiments, system 100 additionally comprises a blower 104 disposed in an upper duct region 142. In some embodiments, exhaust region 108 and upper duct region 142 are defined, or partially defined by airframe 106 or other components of the aircraft.

Primary assembly 102 is mounted by structural baffle 124 which has a plurality of holes 125 to permit the passage of air therethrough. A flow segregator 150 cooperates with primary assembly 102 to segregate the engine compartment 110 from secondary duct region 193, defined between the engine compartment and structural baffle 124. Structural baffle 124 connects the primary assembly 102 to a bulkhead or other structural member of the airframe. In some embodiments structural baffle 124 is mounted to a structural member using a mount ring and a plurality of mounting bolts.

FIG. 1B is a detailed side cutaway schematic diagram of a system 100 for turbine engine exhaust treatment in accordance with some embodiments of the present disclosure. Primary assembly 102 comprises a center body 120, a plurality of vanes 122, a circumferential member 126, a tail cone 128, a nosecap 132, a structural baffle 124, and a mixer 130. The plurality of vanes 122 extend radially outward from the center body 120 and terminate after passing through the circumferential member 126. Mixer 130 is configured to promote thorough mixing of engine core exhaust gases and entrained (ambient) mixing air flows.

A flow segregator 150, discussed further below, contacts the primary assembly 102 to segregate the engine compartment 110 from the secondary duct region 193. In some embodiments, flow segregator 150 is an annular member.

An engine core airflow comprising turbine engine exhaust gas is shown as airflow 134, which moves axially aft toward exhaust region 108 and passes through the primary assembly 102. As discussed in further detail with reference to FIGS. 5 and 7 below, cooling air flows from the engine compartment 110 into the primary assembly 102 and exhaust region 108. The cooling air is used in the vicinity of mixer 130 to mix and cool the engine exhaust flow 134 and the vanes 122 for infrared suppression.

Figure 2B:
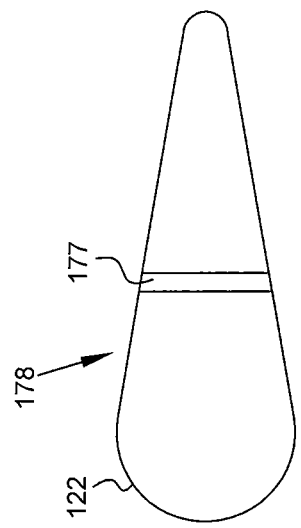
FIGS. 2B and 2C are a top profile views of a vane in accordance with some embodiments of the present disclosure.
Figure 2C:
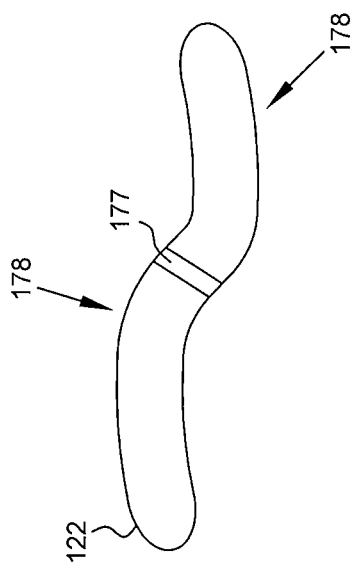
Figure 2A:
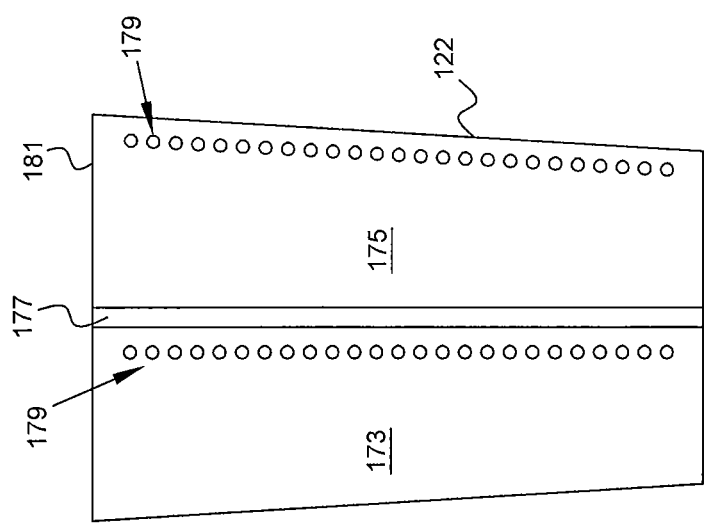
FIG. 2A is a side cutaway view of a vane in accordance with some embodiments of the present disclosure.

FIG. 2A is a side cutaway view of a vane 122 in accordance with some embodiments of the present disclosure. FIGS. 2B and 2C are a top profile views of a vane 122 in accordance with some embodiments of the present disclosure. Each of the plurality of vanes 122 of primary assembly 102 extends from central body 120 and terminates after passing through circumferential member 126. Vanes 122 are hollow and have a radial divider 177 which segregates an axially-forward vane portion 173 from an axially-aft vane portion 175.

In some embodiments, each vane 122 is airfoil shaped, as illustrated in FIG. 2B. In other embodiments, each vane 122 is S shaped, as shown in FIG. 2C. Each vane 122 defines a plurality of perforations 179 at a low pressure region 178.

In operation, each vane 122 is adapted to receive airflow through the radially-outward end 181 into either the axially-forward vane portion 173 or an axially-aft vane portion 175, which are segregated. Air flows into the hollow vane 122 and exits via the plurality of perforations 179 to join air flowing around the exterior of the vane 122.

FIG. 3 is an isometric view of a partially-assembled primary assembly 102 having a center body 120, a plurality of vanes 122, a circumferential member 126, and an interface rim 152 in accordance with some embodiments of the present disclosure. As shown in FIG. 2A, each of the plurality of vanes 122 extend radially outward from the center body 120 and through circumferential member 126 such that each vane 122 terminates at end 181 after extending radially outward from the circumferential member 126. Each vane 122 of the plurality of vanes shown in FIG. 3 has an S-shaped radial profile. In some embodiments each vane 122 has a plurality of perforations 179 in at least one low pressure region 178 to enable fluid communication from the interior of the vane 122 to the exterior of the vane 122.

Interface rim 152 encircles the radially outward surface of circumferential member 126. Interface rim 152 segregates the portion of the primary assembly which is radially outward from the circumferential member 126 into an axially forward portion 162 and axially aft portion 164. As will be explained further below, axially forward portion 162 receives engine compartment air while aft portion 164 receives ambient air, each of which is separated from one another. The aft portion 164 is in fluid communication with the interior of the center body 120 which allows ambient air from the aft portion 164 to flow through the axially-aft vane portion 175 into center body 120 and out through tail cone 128 into the exhaust region.

Figure 4A:
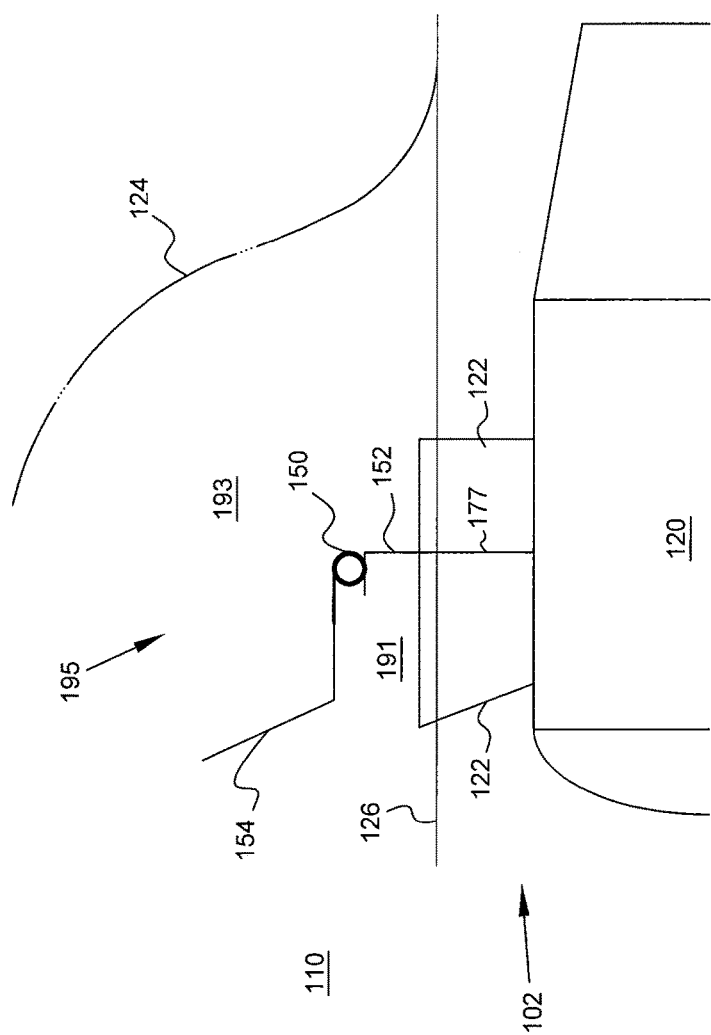
FIG. 4A is a partial cutaway view of a system for turbine engine exhaust treatment in accordance with some embodiments of the present disclosure.
Figure 4B:
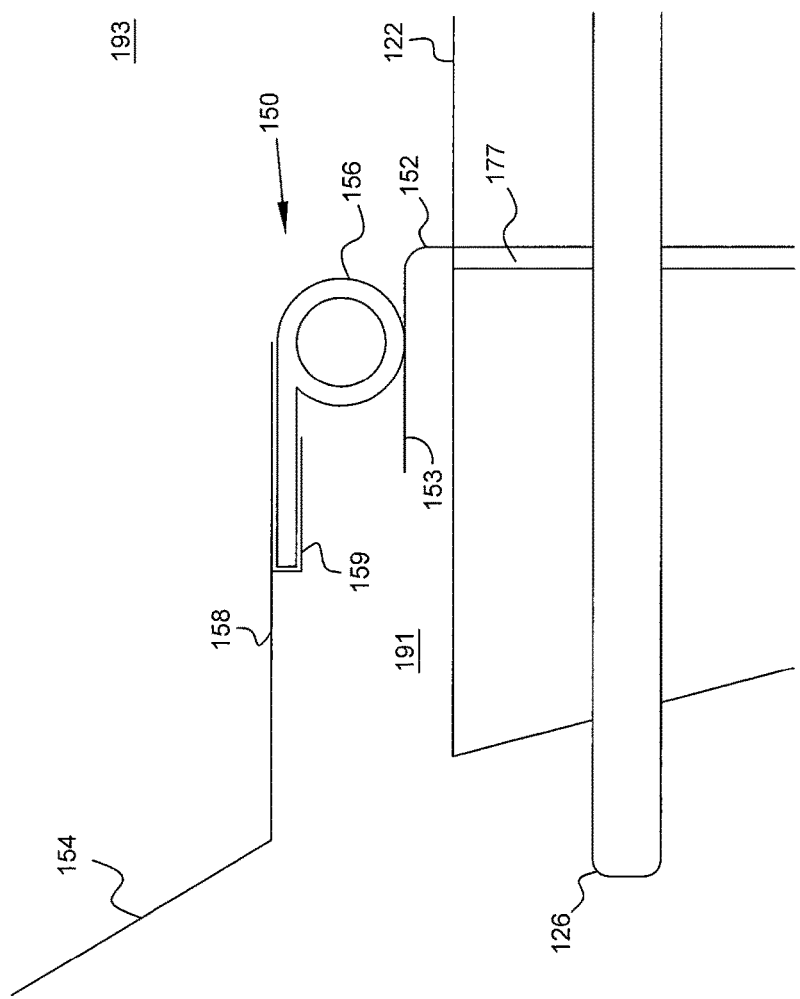
FIG. 4B is an expanded partial cutaway view of the flow segregator shown in FIG. 4A in accordance with some embodiments of the present disclosure.

With an understanding of the construction of the primary assembly 102, attention is now directed to FIGS. 4A and 4B, which illustrate the operation of the flow segregator 150. FIG. 4A is a partial cutaway view of a system 100 for turbine engine exhaust treatment in accordance with some embodiments of the present disclosure. FIG. 4B is an expanded partial cutaway view of the flow segregator 150 shown in FIG. 4A in accordance with some embodiments of the present disclosure. As illustrated in FIGS. 4A and 4B, flow segregator 150 is coupled to an axially-extending wall 154 and flexibly contacted against interface rim 152 which extends from primary assembly 102. The interface rim 152 presents a radial face 153 which is contacted by the flow segregator 150.

In some embodiments, flow segregator 150 comprises a compliant portion 156 and a non-compliant portion 158. In some embodiments, the compliant portion 156 is formed from a flexible material such as a rubber-based material or a rubberized fabric. In some embodiments the flow segregator 150 is shaped as an annular P-seal. In some embodiments, an annular sleeve 159 extends from non-compliant portion 158 to hold compliant portion 156. In some embodiments, the non-compliant portion 158 is formed from a rigid material. In some embodiments the non-compliant portion 158 is an annular sleeve 159 extending axially from wall 154 to retain compliant portion 156.

A first radial chamber 191 is defined radially outward from the primary assembly 102 and radially inward from wall 154 and flow segregator 150. First radial chamber is thus in fluid communication with the engine compartment 110 and circumferentially surrounds the forward part of primary assembly 102. A second radial chamber 193 is defined between the primary assembly 102 and structural baffle 124. Flow segregator 150 segregates the first radial chamber 191 from second radial chamber 193. A radially outer chamber 195 is defined as a combination of first radial chamber 191 and second radial chamber 193.

Figure 7:
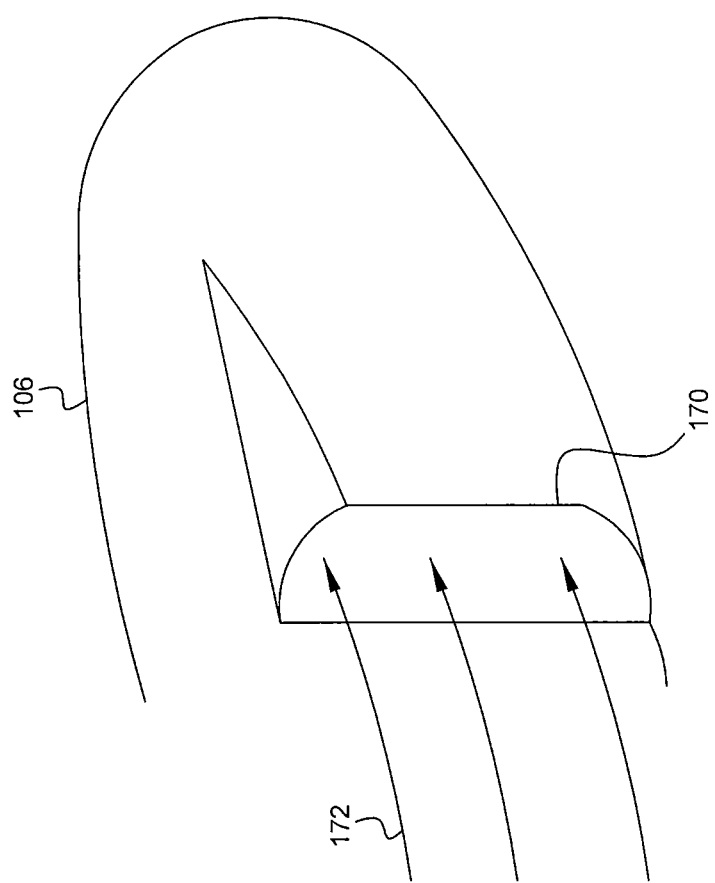
FIG. 7 is a partial isometric view of an exterior airframe having an air inlet in accordance with some embodiments of the present disclosure.

FIG. 7 is a partial isometric view of an exterior airframe (nacelle) 106 having an air inlet 170 for accepting ambient air flow 172. In some embodiments, air inlet 170 is disposed radially outward from engine and axially forward of primary assembly 102. In other embodiments, air inlet 170 is disposed radially outward from primary assembly 102. Air inlet 170 is configured to receive ambient air flow 172 which is at a relatively cool temperature for mixing with engine core exhaust gases in the system 100 for turbine engine exhaust treatment.

Figure 5:
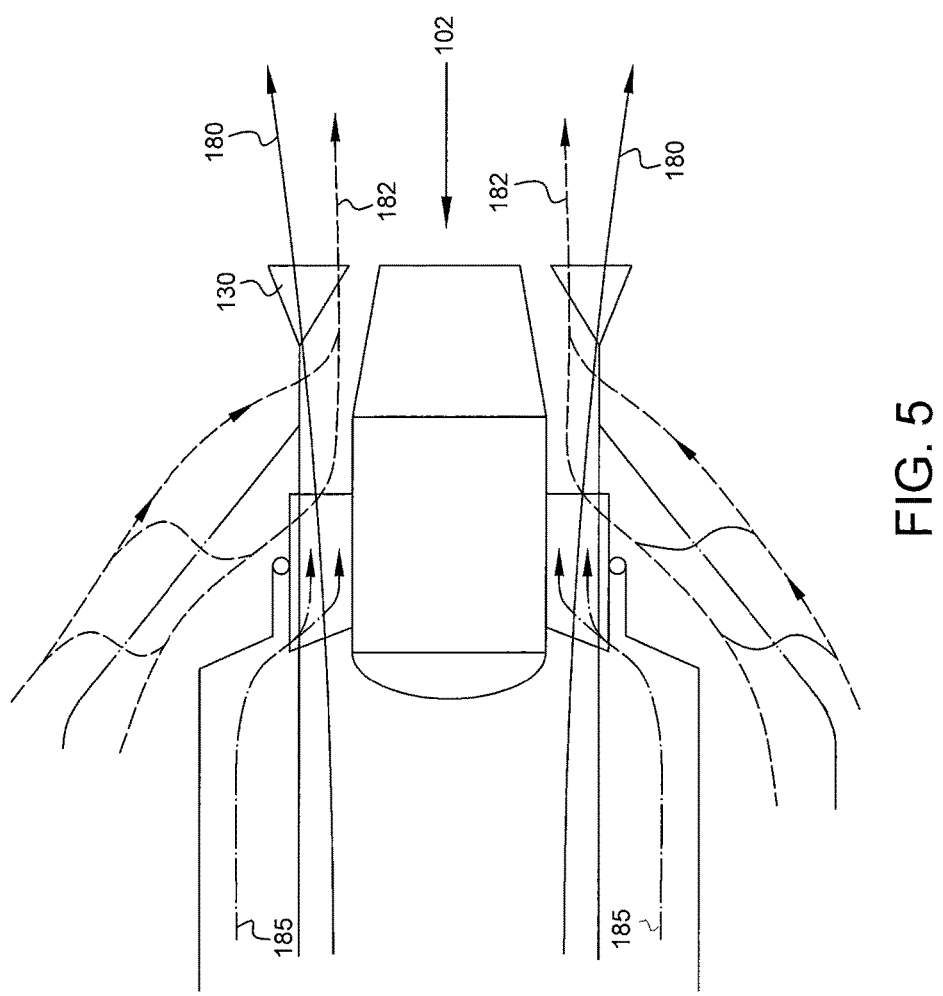
FIG. 5 is a side cutaway view of a system for turbine engine exhaust treatment illustrating various fluid flow paths in accordance with some embodiments of the present disclosure.

FIG. 5 is a side cutaway view of a system 100 for turbine engine exhaust treatment illustrating various fluid flow paths in accordance with some embodiments of the present disclosure. A first fluid flow path 180 is illustrated as a solid line and shows the flow of engine core exhaust gases. First fluid flow path 180 begins at the intake, through the compressor, combustion chamber and turbine (not shown) of engine 111, passes through the plurality of vanes 122 of primary assembly 102 and into mixer 130, and then into exhaust region 108.

A second fluid flow path 182 is illustrated as a dashed line and shows the flow of ambient air. Second fluid flow path 182 begins at the air inlet 170 and flows into primary assembly 102 and mixer 130 before entering exhaust region 108. Portions of the ambient air flow pass through the vanes 122 and are introduced into the core exhaust via the tail cone 128, while another portion of the ambient air flow is introduced in the core exhaust via perforations 179 in low pressure regions 178 of the vanes. Entrained mixing air from blower 104 will, in some embodiments, flow down through the holes 125 of structural baffle 124 and join second fluid flow path 182. In some embodiments, entrained mixing air is admitted axially forward from blower 104, passes through blower 104 and then into the exhaust region 108. Entrained mixing air is generally at a relatively low temperature, thus further cooling the engine exhaust gases or the mixed engine exhaust gases and ambient air in exhaust region 108. Ambient air and entrained mixing air may be referred to as secondary air.

Engine exhaust gases of first fluid flow path 180 are generally at a high temperature, while ambient air of second fluid flow path 182 is generally at a low temperature. The cooling air from the engine compartment 110 passes from the engine compartment 110, enters the volume between the flow segregator 150 and the circumferential member 126 (forward portion 162) enters the forward channel of the vanes and is introduced into the core flow via perforations in a low pressure region of the vane 122. The blending of these flow paths in the assembly 102, the mixer 130 and exhaust region 108 causes cooling of the engine core exhaust gases and cooling of the vanes 122, thus suppressing infrared radiation emissions.

A third fluid flow path 185 is illustrated as a dashed-and-dotted line and shows the flow of engine compartment air which is not core air flow (i.e. not the working fluid of the engine 111). Engine compartment air 185 flows into first radial chamber 191, down into the interior of a vane 122, and into the core flow path via a perforation 179

Figure 6:
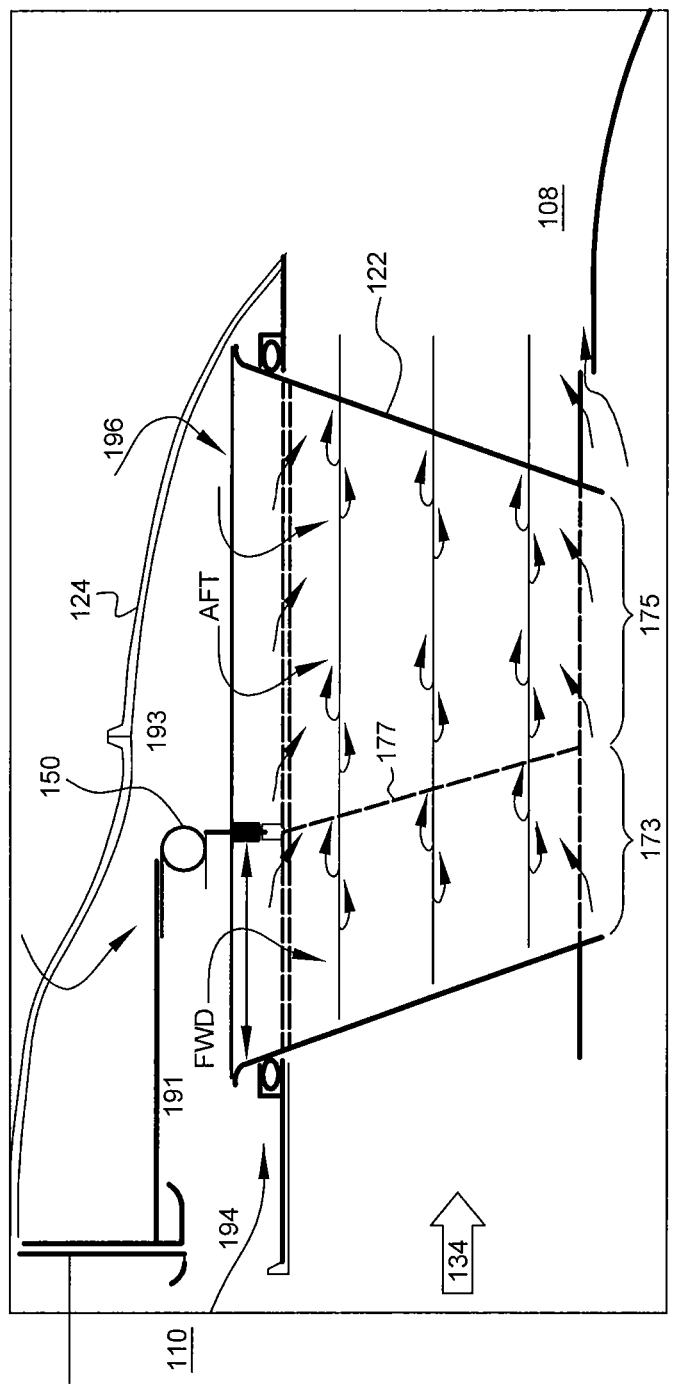
FIG. 6 is a schematic diagram of various fluid flow paths in accordance with some embodiments of the present disclosure.

FIG. 6 is a schematic diagram of various fluid flow paths in accordance with some embodiments of the present disclosure. As illustrated in FIG. 6, engine compartment gases 194 are received in the axially-forward vane portion 173 of primary assembly 102 and pass through the perforations 179 of the plurality of vanes 122 to enter the core engine flow 134. The perforations 179 in the vanes are located at a low pressure region 178 induced in the core engine flow by the shape of the vanes 122. Entrained mixing air or ambient air 196 is directed to the axially-aft vane portion 175. The entrained mixing air or ambient air 196 then is introduced into the core engine flow 134 via perforations 179 in the vanes at low pressure regions 178. The interior of the vanes 122 are separated by a radial divider 177 which runs the entire radial length of the vane 122 and segregates the engine compartment gases 194 from the ambient air flow 196. The radial divider 177 is preferably located between 30 and 50% of the vane chord. Forward of 30% may restrict proper flow in the axial forward vane portion, while greater than 50% may result in core flow entering the vanes. Some of the ambient air 196 as described previously passes into the center body 120 and exits through additional perforation as well as through the tail fin 128. The flows enter the mixer 130 (not shown) and exhaust region 108.

In operation, the flow segregator 150 contacts the axial face 153 of the interface rim 152 to segregate the engine compartment 110 from the entrained air flow path or the ambient air flow path. Flow segregator 150 and interface rim 152 segregate the first radial chamber 191 from the second radial chamber 193 which are radially outward from the circumferential member 126 and vanes 122 of primary assembly 102. Within the assembly, each vane 122 is further segregated by radial divider 177 which segregates axially-forward vane portion 173 from the axially-aft vane portion 175.

Figure 8:
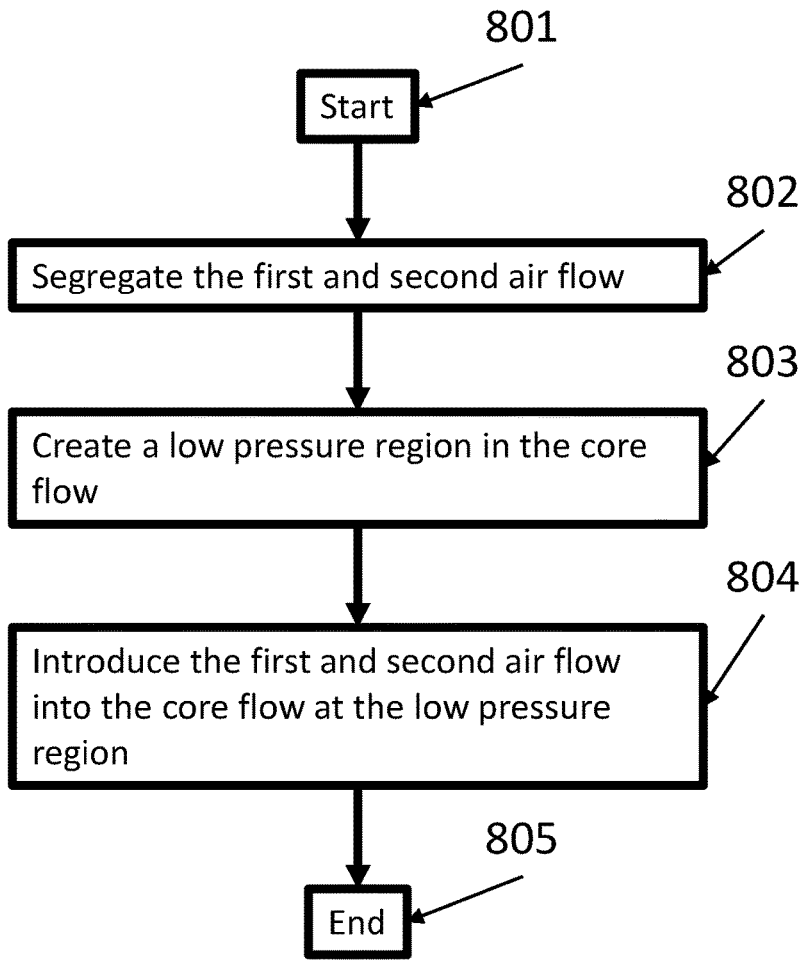
FIG. 8 is a flow chart of a method for use of the turbine exhaust treatment.

FIG. 8 is a flow chart depicting a method of use of the turbine exhaust treatment. As illustrated in FIG. 8, the method 800 follows at least the steps of segregating the first and second air flow 802. Then creating a low pressure region in the core flow 803. Afterwards, the first and second air flows may be introduced into the core flow at the low pressure region.

The disclosed infrared suppressor provides numerous advantages over the prior art. First, the segregation of a first axially forward portion and second axially aft portion of the primary assembly, and the segregation achieved by the flow segregator of the engine compartment from the ambient air and exhaust regions, ensures that the engine compartment is not back-pressured during any point in the operational envelope of the aircraft. If engine exhaust gases and ambient air were not segregated, then during certain operating conditions the ambient air pressure would be great enough to significantly reduce flow or even reverse air flow through the engine compartment, leading to excessive heating of engine components, and degraded engine performance. Additionally, with the flow segregator described herein the infrared suppressor maintains a more consistent performance throughout the flight envelope and various operating conditions of the turbine engine.

The present application discloses one or more of the features recited in the appended claims and/or the following features which, alone or in any combination, may comprise patentable subject matter.

According to an aspect of the present disclosure, a system for turbine exhaust treatment comprises a turbine engine disposed in an engine compartment; an exhaust region; and a primary assembly disposed between the engine compartment and the exhaust region, the primary assembly having a center body, a circumferential member radially spaced from the center body, and a plurality of vanes extending radially outward from the center body and through the circumferential member, wherein the primary assembly is axially segregated radially outward from the circumferential member to form an axially forward portion adapted to receive air flow from the engine compartment and an axially aft portion adapted to receive air flow from a secondary air source; wherein an axially-extending wall separates the engine compartment from the exhaust region, the axially-extending wall terminating in a flow segregator which contacts the primary assembly to segregate the engine compartment from the exhaust region.

In some embodiments the primary assembly is segregated in part by an interface rim which contacts the flow segregator. In some embodiments the flow segregator comprises a compliant portion and a non-compliant portion. In some embodiments the compliant portion is a rubberized fabric P-seal. In some embodiments the non-compliant portion is an annular sleeve extending axially from the wall to the compliant portion. In some embodiments each of the plurality of the vanes has a low pressure area with a plurality of orifices, the plurality of orifices adapted to fluidly communicate between the engine compartment and the exhaust region.

According to another aspect of the present disclosure, a system for turbine exhaust treatment having a plurality of fluid paths including a core path, a plurality of vanes within the core path extending from a center body and terminating in a radially outer chamber, each of the plurality of vanes defining a fluid passage from the outer chamber to the center body, the outer chamber being in fluid communication with an engine compartment and ambient air source, and a flow segregator separating the outer chamber and the fluid passage into an engine compartment flow path and an ambient air fluid path.

In some embodiments the engine compartment flow path is from the engine compartment through the outer chamber and fluid passage into the core path. In some embodiments the flow segregator comprises a seal separating the engine compartment flow path from the ambient air fluid path in the outer chamber. In some embodiments the seal comprises a compliant portion and a non-compliant portion. In some embodiments the compliant portion is a rubberized fabric P-seal. In some embodiments the non-compliant portion is an annular sleeve extending axially from an aft wall of the engine compartment to the compliant portion. In some embodiments a wall within the fluid passage and wherein the engine compartment flow path and the ambient air flow are separated by the wall. In some embodiments the engine compartment flow path is axially forward of the ambient air path flow within the vanes. In some embodiments the vanes have a "S" shaped cross section. In some embodiments the vanes have a low pressure area with a plurality of perforations, the plurality of perforations establishing fluid communication with the engine compartment flow path within the vanes, wherein the pressure within the fluid passage is greater than the pressure in the core flow path proximate to the low pressure area. In some embodiments each vane further comprises a second low pressure area with a second plurality of orifices, the second plurality of orifices establishing fluid communication with the ambient air flow path within the vanes, wherein the pressure within the fluid passage is greater than the pressure in the core flow path proximate to the second low pressure area. In some embodiments the system further comprises a rim co-axial with the core flow and encircling the terminal ends of the vane, wherein the compliant portion is in contact with the rim. In some embodiments the compliant portion accommodates the thermal expansion of the vanes and rim.

According to another aspect of the present disclosure, in a system for turbine exhaust treatment having a core flow, a first air flow, and a second air flow, with a static pressure differential between the first air flow and the second air flow, a method of mixing the first air flow and the second airflow into the core flow comprising: segregating the first and second air flows; creating a low pressure region in the core flow; and introducing the first and second airflow into the core flow at the low pressure region.

Although examples are illustrated and described herein, embodiments are nevertheless not limited to the details shown, since various modifications and structural changes may be made therein by those of ordinary skill within the scope and range of equivalents of the claims.

What is claimed is:

1. A system for turbine exhaust treatment comprising:
a turbine engine disposed in an engine compartment;
an exhaust region; and
a primary assembly disposed between the engine compartment and the exhaust region, the primary assembly having a center body, a circumferential member radially spaced from the center body, and a plurality of vanes extending radially outward from the center body and through the circumferential member, wherein the primary assembly is axially segregated radially outward from the circumferential member to form an axially forward portion adapted to receive air flow from the engine compartment and an axially aft portion adapted to receive air flow from a secondary air source;
wherein an axially-extending wall separates the engine compartment from the exhaust region, the axially-extending wall terminating in a flow segregator which contacts the primary assembly to segregate the engine compartment from the exhaust region.

2. The system of claim 1 wherein the primary assembly is segregated in part by an interface rim which contacts the flow segregator.

3. The system of claim 2 wherein the flow segregator comprises a compliant portion and a non-compliant portion.

4. The system of claim 3 wherein the compliant portion is a rubberized fabric P-seal.

5. The system of claim 4 wherein the non-compliant portion is an annular sleeve extending axially from the axially-extending wall to the compliant portion.

6. The system of claim 5 wherein each of the plurality of the vanes has a low pressure area with a plurality of orifices, the plurality of orifices adapted to fluidly communicate between the engine compartment and the exhaust region.

7. A system for turbine exhaust treatment having a plurality of fluid paths including a core path, a plurality of vanes, stationary with respect to a circumferential member, said plurality of vanes within the core path extending from a center body to the circumferential member defining a radially outer chamber, each of the plurality of vanes defining a fluid passage from the outer chamber to the center body, the outer chamber being in fluid communication with an engine compartment and ambient air source, and a flow segregator separating the outer chamber and the fluid passage into an engine compartment flow path and an ambient air fluid path.

8. The system of Claim 7, wherein the engine compartment flow path is from the engine compartment through the outer chamber and fluid passage into the core path.

9. The system of claim 8, wherein the plurality of vanes have a "S" shaped cross section.

10. The system of claim 9, wherein the plurality of vanes have a low pressure area with a plurality of perforations, the plurality of perforations establishing fluid communication with the engine compartment flow path within the plurality of vanes, wherein the pressure within the fluid passage is greater than the pressure in the core path proximate to the low pressure area.

11. The system of claim 10, each of the plurality of vanes further comprising a second low pressure area with a second plurality of orifices, the second plurality of orifices establishing fluid communication with the ambient air fluid path within the plurality of vanes, wherein the pressure within the fluid passage is greater than the pressure in the core path proximate to the second low pressure area.

12. The system of Claim 7, wherein the flow segregator comprises a seal separating the engine compartment flow path from the ambient air fluid path in the outer chamber.

13. The system of claim 12, wherein the seal comprises a compliant portion and a non-compliant portion.

14. The system of claim 13, wherein the compliant portion is a rubberized fabric P-seal.

15. The system of claim 13, wherein the non-compliant portion is an annular sleeve extending axially from an aft wall of the engine compartment to the compliant portion.

16. The system of claim 13, further comprising a rim co-axial with the core path and encircling the terminal ends of the plurality of vanes, wherein the compliant portion is in contact with the rim.

17. The system of claim 16, wherein the compliant portion accommodates the thermal expansion of the plurality of vanes and rim.

18. The system of claim 12, further comprising a wall within the fluid passage and wherein the engine compartment flow path and the ambient air fluid path are separated by the wall.

19. The system of claim 18, wherein the engine compartment flow path is axially forward of the ambient air path flow within the plurality of vanes.

20. In a system for turbine exhaust treatment having a plurality of vanes, a mixer axially offset from the plurality of vanes, a core flow, a first air flow, and a second air flow, with a static pressure differential between the first air flow and the second air flow, a method of mixing the first air flow and the second air flow into the core flow comprising:
    segregating the first and second air flows;
    creating a low pressure region in the core flow; and
    introducing the first air flow into the core flow axially aligned with or forward of the plurality of vanes; and
    introducing the second airflow into a mix of the first air flow and the core flow.

* * * * *